(12) United States Patent
Ishiyama

(10) Patent No.: US 8,888,032 B2
(45) Date of Patent: Nov. 18, 2014

(54) TAPE CARTRIDGE

(75) Inventor: Kazunori Ishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/614,231

(22) Filed: Sep. 13, 2012

(65) Prior Publication Data

US 2013/0001344 A1 Jan. 3, 2013

Related U.S. Application Data

(63) Continuation of application No. PCT/JP2010/055082, filed on Mar. 24, 2010.

(51) Int. Cl.
*G11B 23/107* (2006.01)
*G11B 23/04* (2006.01)

(52) U.S. Cl.
CPC ............ *G11B 23/107* (2013.01); *G11B 23/044* (2013.01)
USPC ................... 242/348.2; 242/338.1; 242/345.2

(58) Field of Classification Search
USPC ........ 242/348, 348.1, 348.2, 332, 332.4, 338, 242/338.1, 345, 345.2, 608, 608.2; 360/132
See application file for complete search history.

(56) References Cited

U.S. PATENT DOCUMENTS

| | | | |
|---|---|---|---|
| 3,041,005 A | 2/1960 | Wallace | |
| 5,181,153 A * | 1/1993 | Nishimura | 242/345.2 |
| 5,263,659 A * | 11/1993 | Carroll | 242/345.2 |
| 5,893,527 A * | 4/1999 | Mizutani et al. | 242/348 |
| 6,474,582 B2 * | 11/2002 | Zwettler et al. | 242/348.2 |
| 6,618,224 B2 * | 9/2003 | Cripps et al. | 360/132 |
| 6,929,207 B2 * | 8/2005 | Aaron et al. | 242/338.1 |
| 6,929,208 B2 * | 8/2005 | Kuhar et al. | 242/348 |
| 7,204,444 B2 * | 4/2007 | Stamm et al. | 242/338.1 |
| 2003/0234307 A1 * | 12/2003 | Kuhar et al. | 242/348 |
| 2005/0092859 A1 * | 5/2005 | Aaron et al. | 242/338.1 |
| 2005/0184182 A1 * | 8/2005 | Hiraguchi | 242/338.1 |
| 2007/0272790 A1 | 11/2007 | Ishikawa et al. | |
| 2007/0290089 A1 * | 12/2007 | Mori | 242/348 |

FOREIGN PATENT DOCUMENTS

| | | |
|---|---|---|
| JP | 5-270742 | 10/1993 |
| JP | 05-043139 | 2/1996 |
| JP | 2000-504460 | 4/2000 |
| JP | 2005-85417 | 3/2005 |

(Continued)

OTHER PUBLICATIONS

International Search Report mailed May 25, 2010 in corresponding PCT/JP2010/055082.

(Continued)

*Primary Examiner* — William A Rivera
(74) *Attorney, Agent, or Firm* — Staas & Halsey LLP

(57) ABSTRACT

A tape cartridge includes: a first flange member including a first hub portion and a first flange portion; a second flange member including a second hub portion slidably fitting to the first hub portion and a second flange portion, and forming a reel winding a tape in a combination with the first flange member; an engagement portion in which a first through-hole is opened and that is located on a back side of a surface of the second flange portion facing the first flange portion so as to engage with a drive unit included in an external tape driving device; a first protrusion provided to the first hub portion so as to be exposed from the first through-hole and push up the first flange member and space the first flange portion and the second flange portion apart from each other by contacting the drive unit.

4 Claims, 11 Drawing Sheets

(56) References Cited

FOREIGN PATENT DOCUMENTS

| | | |
|---|---|---|
| JP | 2007-299488 | 11/2007 |
| JP | 2007-323777 | 12/2007 |
| JP | 2008-004246 | 1/2008 |
| WO | WO 98/21623 | 5/1998 |

OTHER PUBLICATIONS

Japanese Office Action mailed Nov. 19, 2013 in corresponding Japanese Patent Application No. 2012-506702.

* cited by examiner

TAPE CARTRIDGE

CROSS-REFERENCE TO RELATED APPLICATION

This application is a continuation application of PCT/JP2010/055082 filed Mar. 24, 2010, the contents of which are herein wholly incorporated by reference.

FIELD

A certain aspect of the embodiments is related to a tape cartridge.

BACKGROUND

Conventionally, in regard to a reel winding a tape, there is proposed a tape reel in which the reel is divided into a pair of right and left division reels having a core with an equal diameter inside the respective centers, a core having a small diameter is provided to one of the cores in a protruding condition, a hole into which the core having a small diameter is fitted is provided to the other opposite core, and the width of the reel may be changed by these fitting adjustment as disclosed in Japanese Patent Application Publication No. 5-43139 (Patent Document 1). Such a tape reel may support tapes having different widths.

In a magnetic tape cartridge and the like, there is a case where a tape wound around a reel becomes uneven due to vibration, impact, temperature and humidity. Especially, in recent years, the length of a magnetic tape wound around a reel tends to become longer to increase the storage capacity per reel. Accordingly, the thickness of a magnetic tape becomes thinner. As a result, the strength of a magnetic tape decreases. Thus, once the winding step of a tape occurs, edge folding of a magnetic tape tends to occur.

SUMMARY

According to an aspect of the present invention, there is provided a tape cartridge including: a first flange member that includes a first hub portion and a first flange portion extending outward from the first hub portion; a second flange member that includes a second hub portion slidably fitting to the first hub portion and a second flange portion extending outward from the second hub portion and facing the first flange portion, and forms a reel winding a tape in a combination with the first flange member; an engagement portion in which a first through-hole is opened and that is located on a back side of a surface of the second flange portion facing the first flange portion so as to engage with a drive unit included in an external tape driving device; a housing that includes a top plate and a bottom plate to which an opening portion from which the engagement portion is exposed is provided, and houses the reel so that the first flange member is located on the top plate side and the second flange member is located on the bottom plate side; a first protrusion that is provided to the first hub portion so as to be exposed from the first through-hole provided to the engagement portion and push up the first flange member and space the first flange portion and the second flange portion apart from each other by contacting the drive unit when the drive unit engages with the engagement portion; and a biasing member that biases the first flange member to the second flange member side.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described previously, once the winding step of the tape occurs, edge folding of the magnetic tape tends to occur. The occurrence of edge folding becomes a problem because the error in storing and reproducing data tends to occur. In recent years, the requirement to the reliability of the stored data becomes high because of the increase of the storage capacity and long storage of backup data. Under such circumstances, the requirement to prevent edge folding increases more than before.

However, the tape reel disclosed in Patent Document 1 may merely adjust the width of the reel in accordance with the width of the tape in advance, and does not prevent edge folding of the tape actively.

Hereinafter, a description will be given of an embodiment of the present invention with reference to the attached drawings. In drawings, the size, the ratio and the like of each portion may be not illustrated to correspond to those of actual portions completely. In addition, in several drawings, detail illustration may be omitted.

Figure 1:
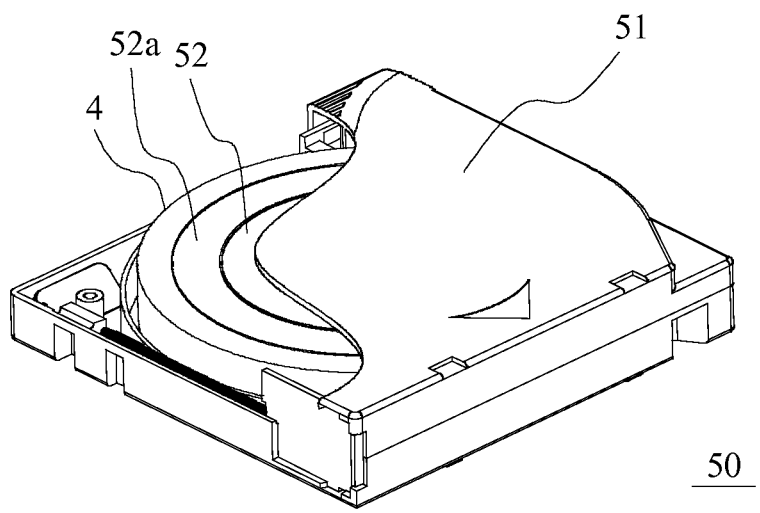
FIG. 1 is a perspective view of a conventional tape cartridge in which a part of a housing is illustrated in a cut-off manner.
Figure 2:
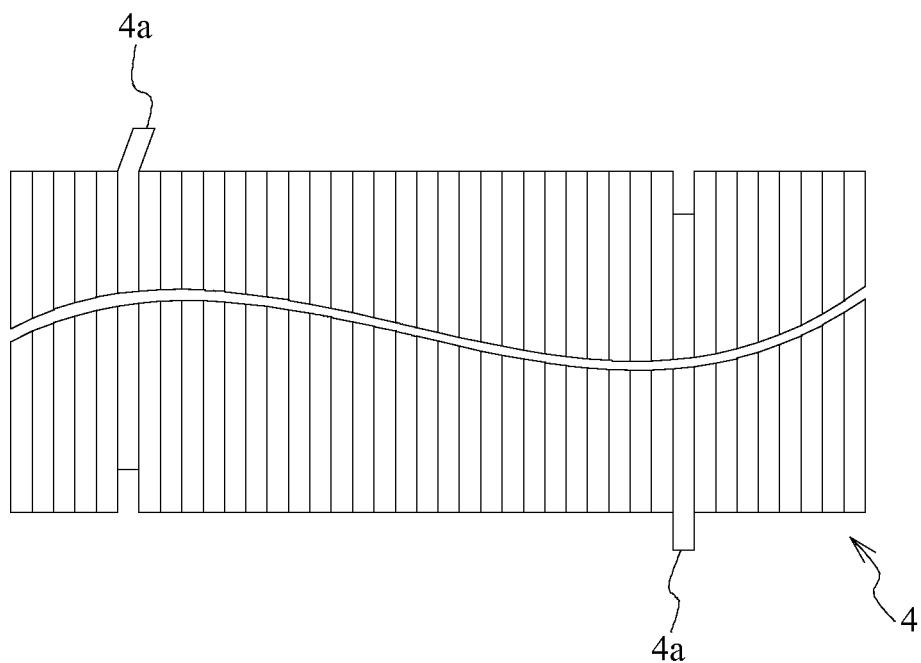
FIG. 2 is an explanatory diagram illustrating edge folding occurring in a tape wound around a reel.

Before giving an description of an embodiment disclosed in the present specification in detail, a description will be given of edge folding of a tape that may occur in a conventional tape cartridge 50 with reference to FIG. 1 and FIG. 2. A magnetic tape (hereinafter, referred to simply as a "tape") 4 is housed within a housing 51 with being wound around a reel 52 provided with a flange portion 52a. FIG. 2 is an explanatory diagram illustrating edge folding that occurs in the tape wound around the reel. In the tape 4 wound around the reel 52, as illustrated in FIG. 2, there is a case where edge parts 4a protrude due to the vibration and impact applied to the tape cartridge 50 and the change in temperature and humidity. Protruding edge parts 4a cause edge folding by contacting the flange portion 52a. If such edge folding occurs during the long storage of the tape cartridge 50 to which the writing of data is completed, it becomes a problem because it becomes impossible to read data out from the tape 4. A tape cartridge 1 in accordance with the embodiment described hereinafter prevents such edge folding of the tape 4.

Figure 3A:
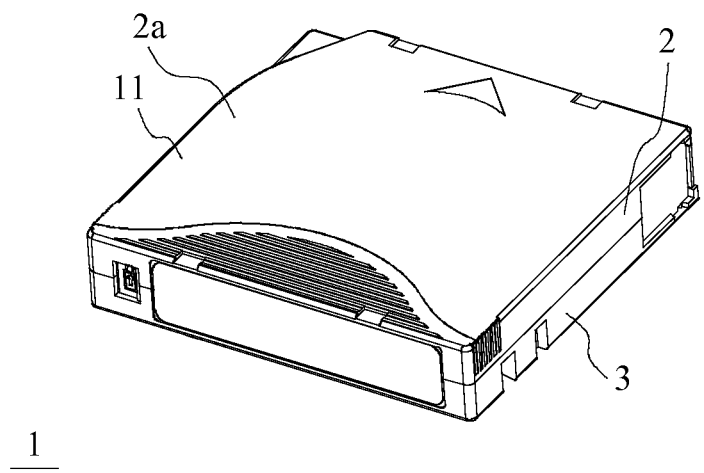
FIG. 3A is a perspective view of a tape cartridge of an embodiment viewed from a top plate side.
Figure 3B:
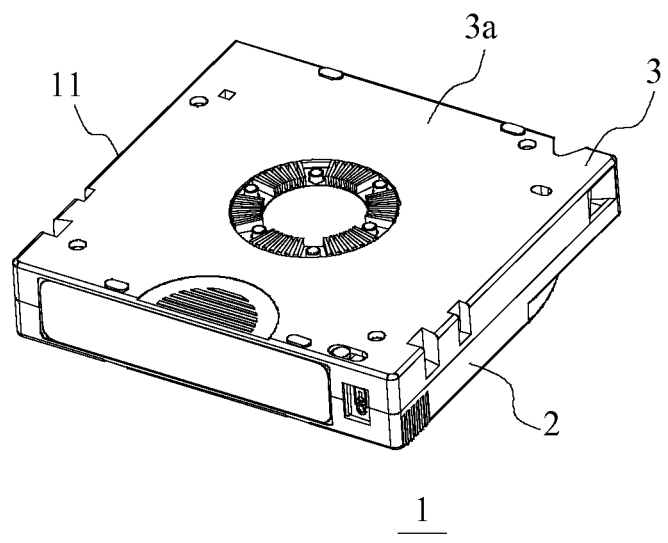
FIG. 3B is a perspective view illustrating the tape cartridge of the embodiment viewed from a bottom plate side.
Figure 4:
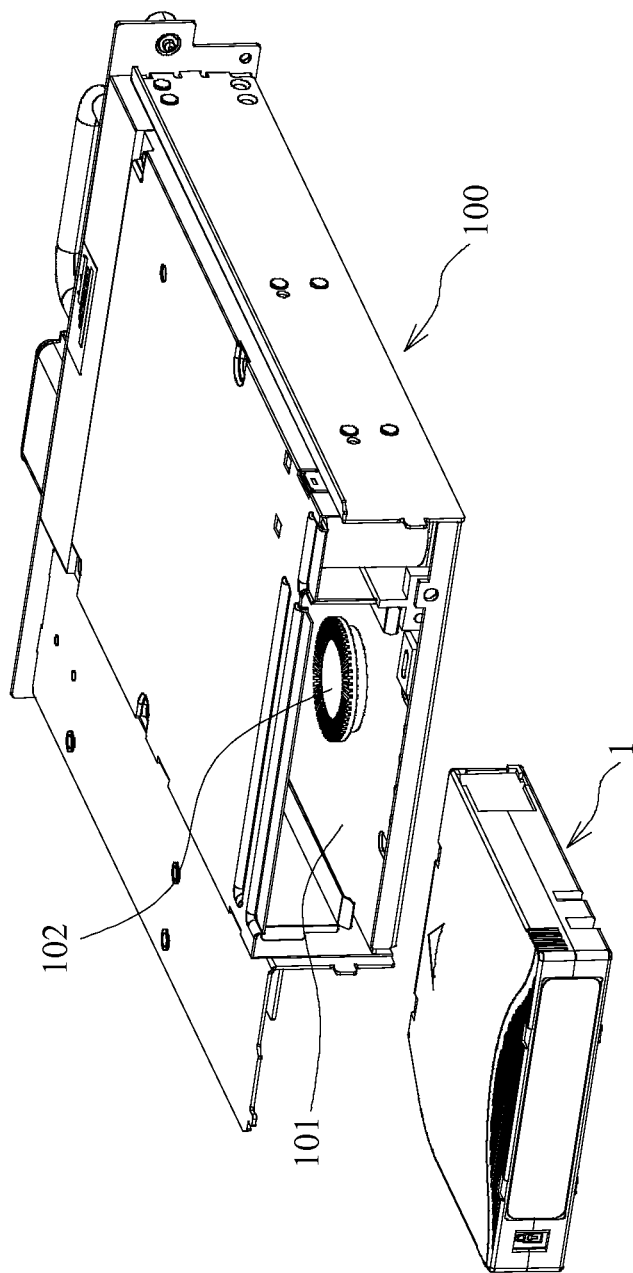
FIG. 4 is a perspective view illustrating the tape cartridge of the embodiment and a tape driving device.

FIG. 3A is a perspective view of the tape cartridge in accordance with the embodiment viewed from a top plate 2a side, and FIG. 3B is a perspective view of the tape cartridge in accordance with the embodiment viewed from a bottom plate 3a side. The tape cartridge 1 is provided with a housing 11 made by combining a first case 2 and a second case 3. The housing 11 includes the top plate 2a and the bottom plate 3a. The above described tape cartridge 1 is drawn into a tape driving device 100 illustrated in FIG. 4. The tape driving device 100 reads data from and writes data to the tape 4. The tape driving device 100 is provided with a driving disk 102 corresponding to a drive unit inside an insertion part 101. The driving disk 102 is provided with interlocking gears along the entire perimeter. The tape cartridge 1 is driven by the engagement of an engagement portion 6c described later with the driving disk 102.

Figure 5:
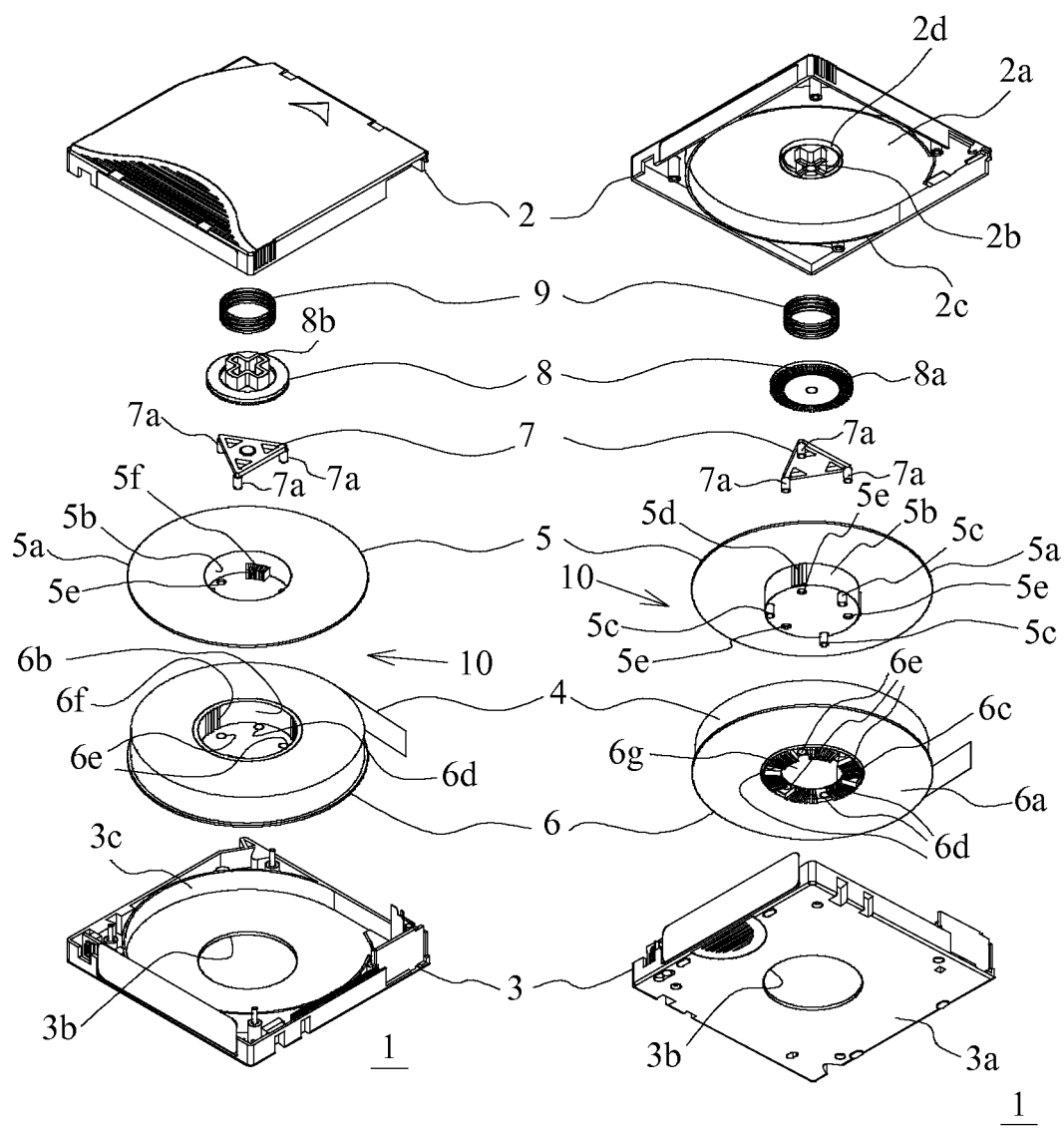
FIG. 5 is an exploded perspective view of the tape cartridge of the embodiment viewed from the top plate side and the bottom plate side.

A description will now be given of an internal structure of the tape cartridge 1 with reference to FIG. 5. FIG. 5 is an exploded perspective view of the tape cartridge 1 of the embodiment viewed from the top plate 2a side and the bottom plate 3a side. The first case 2 provided to the tape cartridge 1 includes a cross-shaped lock key 2b at the center area of the inner surface side of the top plate 2a. In addition, the first case 2 includes a guide portion 2c having a shape along the circumference of a reel 10 described later. Furthermore, the first case 2 includes a spring guide 2d surrounding the lock key 2b. The spring guide 2d holds a spring 9 described in detail later. The second case 3 provided to the tape cartridge 1 includes an opening portion 3b, from which the engagement portion 6c described in detail later is exposed, in the bottom plate 3a. In addition, the second case 3 includes a guide portion 3c having a shape along the circumference of the reel 10 described in detail later.

The reel 10 is housed within the housing 11 made by the combination of the above described first case 2 and second case 3. The reel 10 includes a first flange member 5 provided with a first flange portion 5a and a second flange member 6 provided with a second flange portion 6a.

Figure 6A:
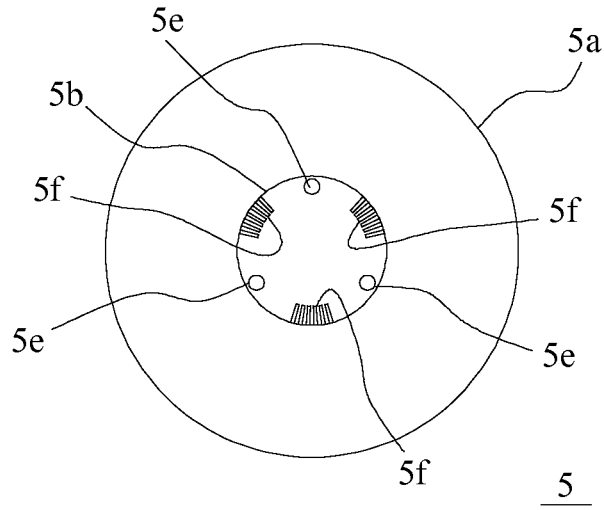
FIG. 6A is a plain view of a first flange member.
Figure 6B:
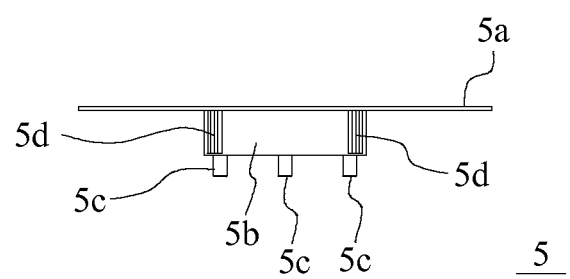
FIG. 6B is a side view of the first flange member.
Figure 6C:
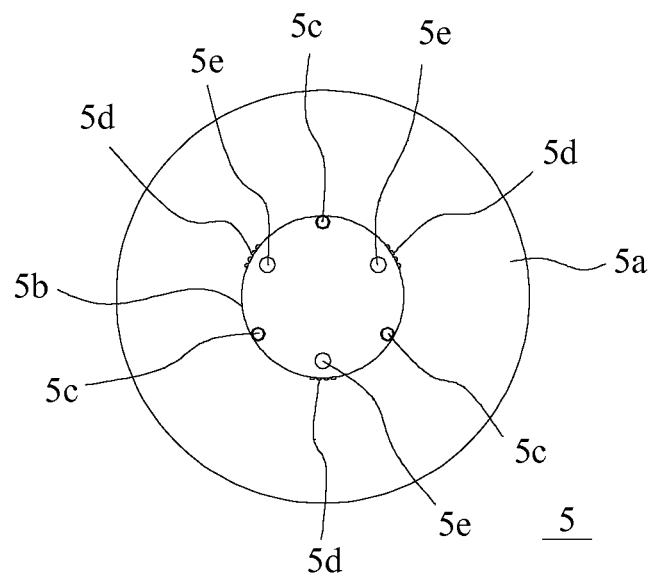
FIG. 6C is a bottom view of the first flange member.
Figure 7A:
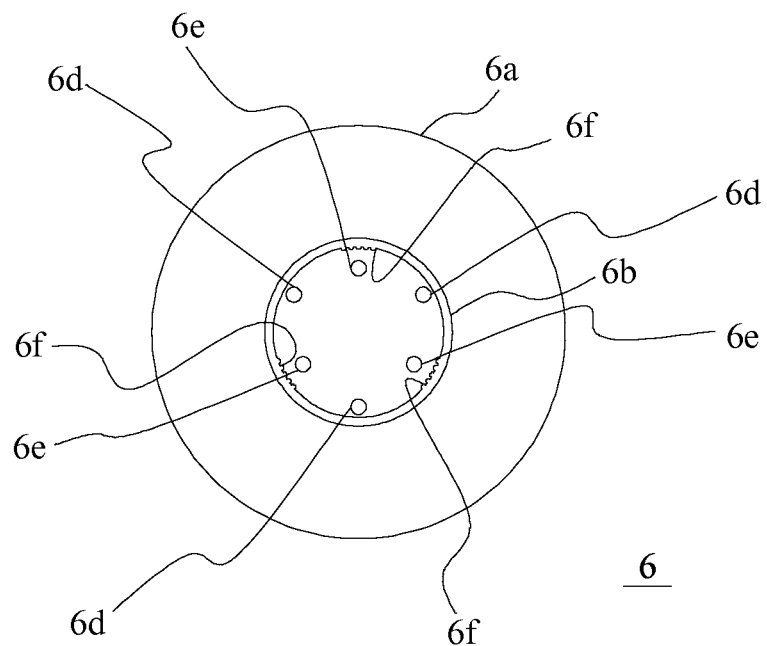
FIG. 7A is a plain view of a second flange member.
Figure 7B:
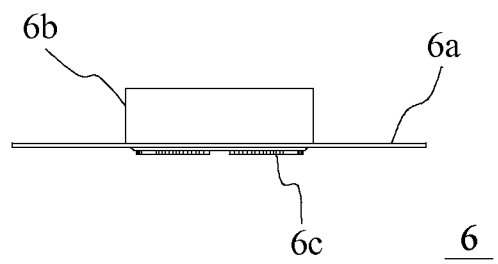
FIG. 7B is a side view of the second flange member.
Figure 7C:
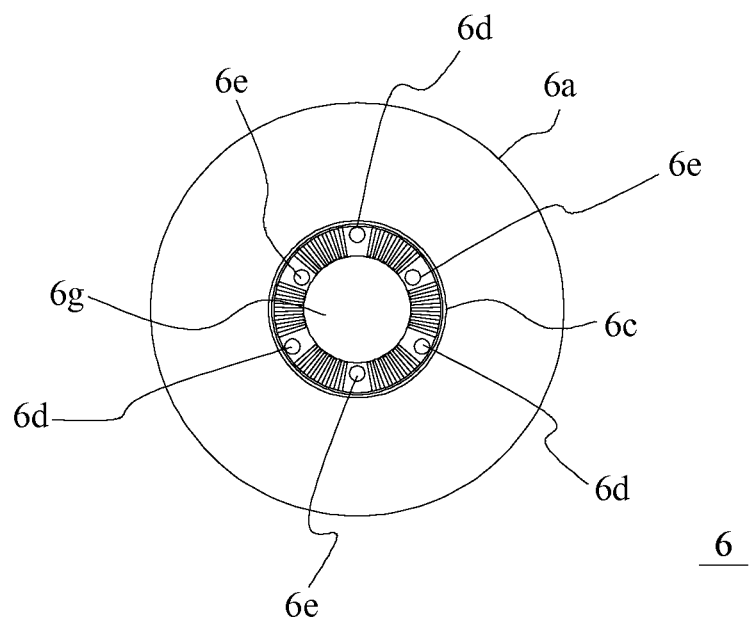
FIG. 7C is a bottom view of the second flange member.
Figure 8A:
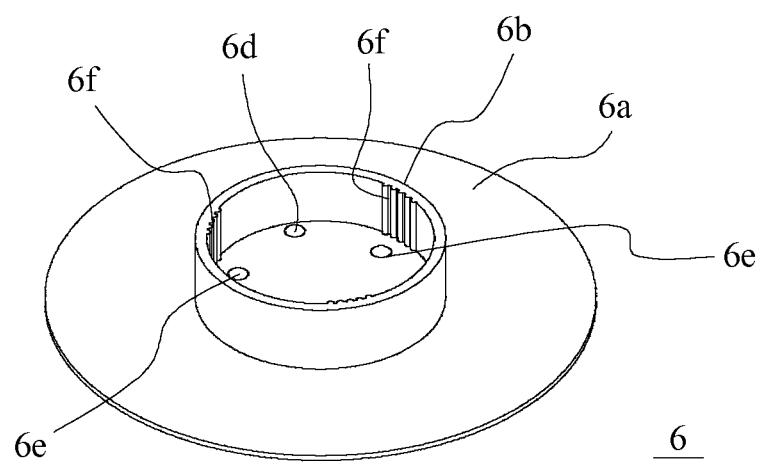
FIG. 8A is a perspective view of the second flange member viewed from a second hub portion side.
Figure 8B:
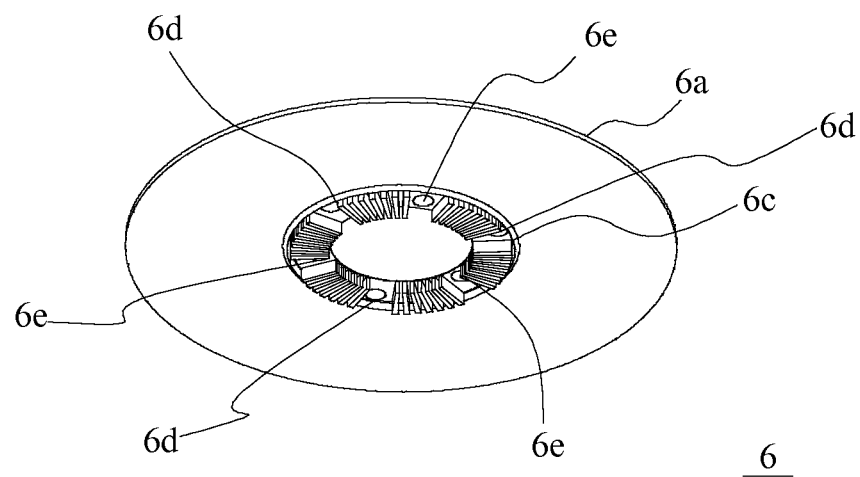
FIG. 8B is a perspective view of the second flange member viewed from a second flange side.

The first flange member 5 is provided with a first hub portion 5b and the first flange portion 5a extending outward from the first hub portion 5b as illustrated in detail in FIG. 6A, FIG. 6B and FIG. 6C. The first hub portion 5b includes first protrusions 5c arranged in a triangle shape. The first hub portion 5b has a concave cylindrical shape of which the side to which the first flange portion 5a is provided is opened. The first hub portion 5b is provided with longitudinal grooves 5d corresponding to an outside engagement portion on such a cylindrically-shaped external wall. Longitudinal grooves 5d extend in the direction of axis of the first hub portion 5b. First protrusions 5c are provided to a cylindrically-shaped tip portion of the first hub portion 5b. First protrusions 5c are exposed from first through-holes 6d provided to the engagement portion 6c, and contact the driving disk 102 when the driving disk 102 engages with the engagement portion 6c. Accordingly, first protrusions 5c push up the first flange member 5, and space the first flange portion 5a and the second flange portion 6a apart from each other.

The first flange member 5 further includes third through-holes 5e through which second protrusions 7a provided to a release block 7 described in detail later passes. Second through-holes 6e are provided to the engagement portion 6c. The first hub portion 5b is provided with a rotation stop portion 5f, with which a rotation stop member 8 described in detail later engages, thereinside.

The second flange member 6 is provided with a second hub portion 6b that slidably fits to the first hub portion 5b as illustrated in detail in FIG. 7A, FIG. 7B, FIG. 7C, FIG. 8A and FIG. 8B. The second flange member 6 is provided with the second flange portion 6a extending outward from the second hub portion 6b. The second flange portion 6a faces the first flange portion 5a when the first hub portion 5b fits to the second hub portion 6b. The second hub portion 6b has a concave cylindrical shape of which the side different from the side to which the second flange portion 6a is provided is opened. The tape 4 is wound around the outer periphery of the second hub portion 6b. The second hub portion 6b includes longitudinal grooves 6f corresponding to a rotation stop portion on such a cylindrically-shaped internal wall. Longitudinal grooves 6f extend in the direction of axis of the second hub portion 6b. Longitudinal grooves 6f engage with longitudinal grooves 5d.

Longitudinal grooves 5d and longitudinal grooves 6f function as a guide when the second hub portion 6b fits to the first hub portion 5b, and also function as a rotation stopper between the second hub portion 6b and the first hub portion 5b.

The second flange member 6 includes the engagement portion 6c on the back side of the surface of the second flange portion 6a facing the first flange portion 5a. The engagement portion 6c is provided with interlocking gears engaging with the driving disk 102 provided to the tape driving device 100. In addition, in the engagement portion 6c, first through-holes 6d and second through-holes 6e are opened. Above-described first protrusions 5c are exposed from first through-holes 6d. Second protrusions 7a described in detail later are exposed from second through-holes 6e. A magnetic attachment portion 6g is provided to the center area of the engagement portion 6c. The magnetic attachment portion 6g is magnetically attached to a magnetic attachment member provided to the driving disk 102. Accordingly, the driving disk 102 and the engagement portion 6c easily engage with each other.

The reel 10 including the above-described first flange member 5 and second flange member 6 is housed within the housing 11 so that the first flange member 5 is located on the top plate 2a side and the second flange member 6 is located on the bottom plate 3a side.

The tape cartridge 1 includes, as illustrated in FIG. 5, the spring 9 that is an example of a biasing member that biases the first flange member 5 to the second flange member 6 side. The spring 9 is positioned and held by the spring guide 2d as described above. The tape cartridge 1 is further provided with the rotation stop member 8 and the release block 7 that is an example of a release member. The rotation stop member 8 includes an engagement portion 8a having interlocking gears. In addition, the rotation stop member 8 includes a cross-shaped key groove 8b that engages with the lock key 2b.

The rotation stop member 8 is pressed against the rotation stop portion 5f provided to the first hub portion 5b by the spring 9 which is an example of the biasing member. Accordingly, the first flange member 5 and the top plate 2a are connected to each other. That is to say, a state in which the rotation stop member 8 is unable to rotate against the top plate 2a is achieved by the engagement of the key groove 8b with the lock key 2b. When the rotation stop member 8 is pressed against the rotation stop portion 5f while the engagement state of the key groove 8b with the lock key 2b is remained, the first flange member 5 and the top plate 2a become connected to each other. As a result, the first flange member 5 becomes unable to rotate, and the rotation of the reel 10 is stopped.

The release block 7 is located between the rotation stop member 8 and the first flange member 5 as illustrated in FIG. 5. The release block 7 includes second protrusions 7a arranged in a triangle shape. Second protrusions 7a pass through third through-holes 5e provided to the first hub portion 5b, and are exposed from second through-holes 6e provided to the engagement portion 6c. Second protrusions 7a contact the driving disk 102 when the driving disk 102 engages with the engagement portion 6c. The release block 7 is pushed up by the contact of second protrusions 7a with the driving disk 102. Accordingly, the release block 7 pushes up the rotation stop member 8 against the biasing force of the spring 9, and spaces the rotation stop member 8 and the first flange member 5 apart from each other. As a result, the engagement of the rotation stop member 8 with the rotation stop portion 5f provided to the first hub portion 5b is released, and a state in which the reel 10 may rotate is achieved.

Figure 9:
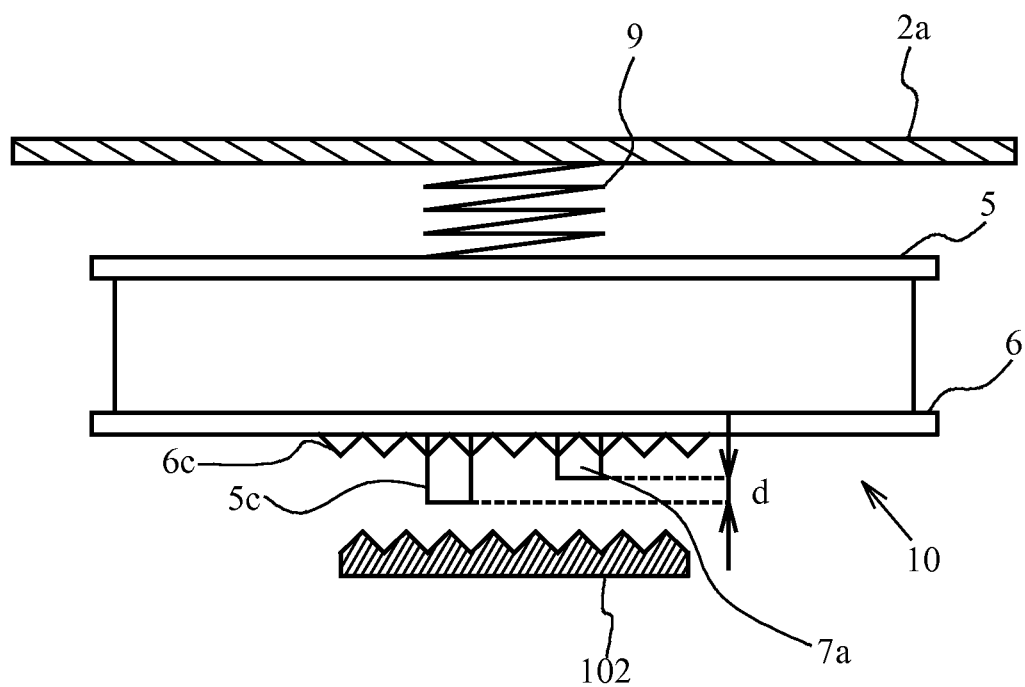
FIG. 9 is an explanatory diagram schematically illustrating a relation between the protrusion amount of first protrusions and the protrusion amount of second protrusions.

Here, a description will be given of a relation between first protrusions 5c and second protrusions 7a with reference to FIG. 9. FIG. 9 is an explanatory diagram schematically illustrating a relation between the protrusion amount of first protrusions 5c and the protrusion amount of second protrusions 7a. As illustrated in FIG. 9, the amount of protrusion of first protrusions 5c from the engagement portion 6c is set to be larger than the amount of protrusion of second protrusions 7a from the engagement portion 6c by d. Accordingly, when the driving disk 102 engages with the engagement portion 6c, first protrusions 5c contact the driving disk 102 before second protrusions 7a do. Thus, when the driving disk 102 engages with the engagement portion 6c, the first flange member 5 is pushed up before the release block 7 is. As a result, before the state in which the reel 10 may rotate is achieved, the distance between the first flange portion 5a and the second flange portion 6a becomes farther. Accordingly, while preventing edge folding, the tape 4 is drawn out from the reel 10 smoothly, or is wound around the reel 10 smoothly.

Next, a description will be given of an operation of the tape cartridge 1 when the above-described tape cartridge 1 is inserted into the insertion part 101 of the tape driving device 100.

Figure 10:
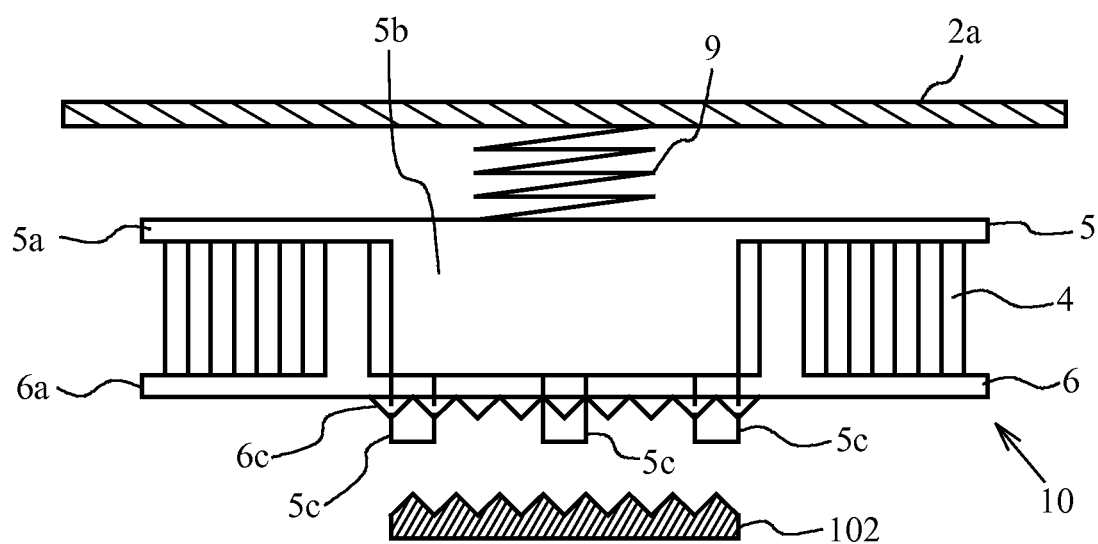
FIG. 10 is an explanatory diagram schematically illustrating a reel in a state before a driving disk engages with an engagement portion.

A description will be given of a state of the tape cartridge 1 when it is taken out from the tape driving device 100. As illustrated in FIG. 10, the first flange member 5 is biased by the spring 9, and is moved to the second flange member 6 side. The edge surface of the tape 4 wound around the reel 10 contacts the first flange portion 5a and the second flange portion 6a. Accordingly, a state in which the protrusion of the edge part 4a of the tape 4 does not easily occur is maintained. In addition, the rotation stop member 8 is pressed to the first flange member 5 side by the spring 9, and the engagement portion 8a engages with the rotation stop portion 5f. Thus, the reel 10 is unable to rotate.

Figure 11:
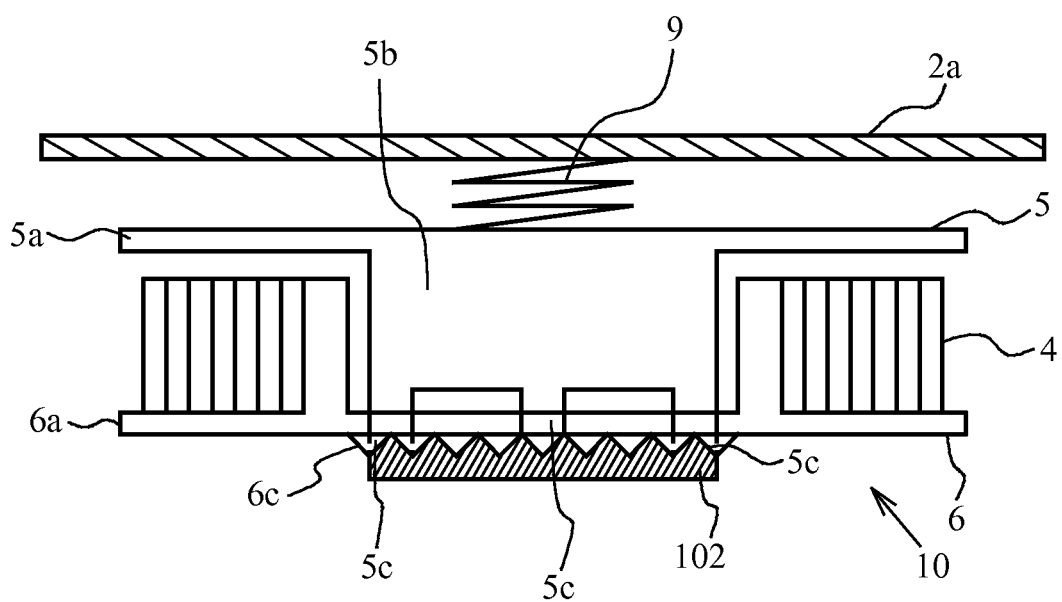
FIG. 11 is an explanatory diagram schematically illustrating the reel in a state in which the driving disk engages with the engagement portion.

When the tape cartridge 1 in the above-described state is inserted into the insertion part 101 of the tape driving device 100, the driving disk 102 is engaged with the engagement portion 6c as illustrated in FIG. 11. The driving disk 102 contacts first protrusions 5c and second protrusions 7a exposed from the engagement portion 6c. At this time, the driving disk 102 contacts first protrusions 5c first, and then contacts second protrusions 7a. The driving disk 102 pushes up the first flange member 5 by contacting first protrusions 5c first. Accordingly, a space is formed between the first flange portion 5a and the edge surface of the tape 4 wound in a roll form. At this time, the first flange member 5 slides with being in a state in which longitudinal grooves 5d engage with longitudinal grooves 6f. After that, the driving disk 102 releases the engagement of the rotation stop member 8 with the rotation stop portion 5f provided to the first hub portion 5b by pushing up the release block 7. Accordingly, the reel 10 becomes able to rotate, and the drawing-out of and winding of the tape 4 become possible.

When the tape cartridge 1 is taken out from the tape driving device 100, the reel 10 becomes unable to rotate again. At the same time, the tape 4 wound in a roll form is sandwiched by the first flange portion 5a and the second flange portion 6a. Accordingly, it is possible to suppress the protrusion of the edge part 4a of the tape 4, and to prevent the occurrence of edge folding.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention. For example, although the number of reel is one in the above described embodiment, the tape cartridge may include a plurality of reels. In addition, in the above described embodiment, a description was given of the tape cartridge winding a magnetic tape, but a present invention may be applied to a tape cartridge winding other tapes.

What is claimed is:

1. A tape cartridge comprising:
   a first flange member that includes a first hub portion and a first flange portion extending outward from the first hub portion;
   a second flange member that includes a second hub portion slidably fitting to the first hub portion and a second flange portion extending outward from the second hub portion and facing the first flange portion, and forms a reel winding a tape in a combination with the first flange member;
   a biasing member that biases the first flange member to the second flange member side;
   an engagement portion in which a first through-hole is opened and that is located on a back side of a surface of the second flange portion facing the first flange portion and the engagement portion that engages with a drive unit included in an external tape driving device;
   a housing that includes a top plate and a bottom plate to which an opening portion from which the engagement portion is exposed is provided, and houses the reel so that the first flange member is located on the top plate side and the second flange member is located on the bottom plate side; and
   a first protrusion that is provided to the first hub portion so as to be exposed from a surface of the engagement portion in the second flange portion via the first through-hole when the drive unit does not engage with the engagement portion, the first protrusion that is provided to slide inside the first through-hole against a biasing force of the biasing member by contacting the drive unit and space the first flange portion and the second flange portion apart from each other against the biasing force of the biasing member when the drive unit engages with the engagement portion.

2. The tape cartridge according to claim 1, wherein the first hub portion has a cylindrical shape and is provided with an outside engagement portion on an external wall which extends in a direction of an axis of the first hub and in a direction around the axis of the first hub, and the second hub portion has a cylindrical shape and is provided with a rotation stop portion engaging with the outside engagement portion on an internal wall which extends in a direction of an axis of the second hub and in a direction around the axis of the second hub.

3. The tape cartridge according to claim 2, wherein the outside engagement portion is a longitudinal groove extending in the direction of the axis of the first hub portion, and
the rotation stop portion is a longitudinal groove extending in the direction of the axis of the second hub portion.

4. The tape cartridge according to claim 1, further comprising:

a rotation stop member that is pressed against the first flange member by the biasing member, and achieves a state in which the first flange member is connected to the top plate and the rotation of the first flange member is stopped; and a release member that includes a second protrusion exposed from a second through-hole provided to the engagement portion and contacting the drive unit when the drive unit engages with the engagement portion, and is located between the rotation stop member and the first flange member so as to be pushed up by the contact of the second protrusion with the drive unit and space the rotation stop member and the first flange member apart from each other, wherein when the drive unit does not engage with the engagement portion, the amount of protrusion of the first protrusion provided to the first flange member from the engagement portion is set to be larger than the amount of protrusion of the second protrusion provided to the release member from the engagement portion.

* * * * *